(12) United States Patent
Verbist et al.

(10) Patent No.: US 12,304,985 B2
(45) Date of Patent: May 20, 2025

(54) PROCESS FOR PREPARING SULFUR CONTAINING ORGANOSILANE POLYMERS

(71) Applicant: SHELL OIL COMPANY, Houston, TX (US)

(72) Inventors: Guy Lode Magda Maria Verbist, Amsterdam (NL); Cees Weijers, Eindhoven (NL); Christina Georgieva Christova-Zdravkova, Eindhoven (NL); Joice Sandra Klitzke, Eindhoven (NL); Alexey Deyko, Eindhoven (NL); Rafael Jean Sablong, Eindhoven (NL)

(73) Assignee: SHELL USA, INC., Houston, TX (US)

( * ) Notice: Subject to any disclaimer, the term of this patent is extended or adjusted under 35 U.S.C. 154(b) by 1004 days.

(21) Appl. No.: 17/428,147

(22) PCT Filed: Jul. 15, 2019

(86) PCT No.: PCT/EP2019/068993
§ 371 (c)(1),
(2) Date: Aug. 3, 2021

(87) PCT Pub. No.: WO2020/016174
PCT Pub. Date: Jan. 23, 2020

(65) Prior Publication Data
US 2022/0127400 A1 Apr. 28, 2022

(30) Foreign Application Priority Data
Jul. 19, 2018 (EP) ..................... 18184353

(51) Int. Cl.
*C08F 230/08* (2006.01)
*C08K 3/06* (2006.01)
(Continued)

(52) U.S. Cl.
CPC ............ *C08F 230/085* (2020.02); *C08K 3/06* (2013.01); *C08K 5/40* (2013.01); *H01M 10/3909* (2013.01)

(58) Field of Classification Search
None
See application file for complete search history.

(56) References Cited

U.S. PATENT DOCUMENTS 3,925,331 A    12/1975   Ely
4,096,131 A     6/1978   Price et al.
(Continued)

FOREIGN PATENT DOCUMENTS

CN      103199250 A    7/2013
EP       2610228 A1    7/2013
(Continued)

OTHER PUBLICATIONS

English machine translation of JP 2001-226532 (Year: 2001).*
(Continued)

*Primary Examiner* — Megan McCulley
(74) *Attorney, Agent, or Firm* — SHELL USA, INC.

(57) ABSTRACT

The present invention provides a process for preparing sulfur-containing branched organosilane polymers comprising: reacting sulfur with a vinyl silane compound in a solvent and in the presence of a catalytic amount of an accelerator at an elevated temperature of at least 40° C. The process, and the organosilane polymers obtained by using the process, are very suitable for application in battery technologies.

8 Claims, 4 Drawing Sheets

(51) Int. Cl.
    *C08K 5/40*     (2006.01)
    *H01M 10/39*     (2006.01)

(56) References Cited

U.S. PATENT DOCUMENTS

| | | | |
|---|---|---|---|
| 4,384,132 | A | 5/1983 | Schwarz |
| 5,580,919 | A | 12/1996 | Agostini et al. |
| 8,308,971 | B1 | 11/2012 | Bhat et al. |
| 8,703,344 | B2 | 4/2014 | Bhat et al. |
| 8,877,385 | B2 | 11/2014 | Kamine et al. |
| 9,257,697 | B2 | 2/2016 | Oya et al. |
| 9,647,272 | B1 | 5/2017 | Cheng et al. |
| 9,876,211 | B2 | 1/2018 | Son et al. |
| 9,979,008 | B2 | 5/2018 | Dai et al. |
| 10,079,405 | B2 | 9/2018 | Smith et al. |
| 10,355,313 | B2 | 7/2019 | Pena Hueso et al. |
| 2004/0157122 | A1 | 8/2004 | Naoi et al. |
| 2004/0197653 | A1 | 10/2004 | Inatomi et al. |
| 2005/0042515 | A1 | 2/2005 | Hwang et al. |
| 2009/0165760 | A1 | 7/2009 | Buttery et al. |
| 2009/0241882 | A1 | 10/2009 | Brunner et al. |
| 2015/0155549 | A1 | 6/2015 | Moganty et al. |
| 2015/0303460 | A1 | 10/2015 | Murata et al. |
| 2016/0264601 | A1* | 9/2016 | Rossle .................... C08L 9/00 |
| 2018/0297403 | A1 | 10/2018 | Kitago et al. |
| 2021/0135232 | A1 | 5/2021 | Verbist et al. |

FOREIGN PATENT DOCUMENTS

| | | | |
|---|---|---|---|
| JP | 2001226383 | A | 8/2001 |
| JP | 2001226532 | A | 8/2001 |
| JP | 2011023303 | A | 2/2011 |
| JP | 2014522078 | A | 8/2014 |
| JP | 2017517603 | A | 6/2017 |
| JP | 2018065980 | A | 4/2018 |
| KR | 20020025379 | A | 4/2002 |
| KR | 20160019704 | A | 2/2016 |
| KR | 101717209 | B1 | 3/2017 |
| WO | 2007065920 | A2 | 6/2007 |
| WO | 2008148814 | A2 | 12/2008 |
| WO | 2008152054 | A1 | 12/2008 |
| WO | 2010012601 | A1 | 2/2010 |

OTHER PUBLICATIONS

English machine translation of JP 2018-065980 (Year: 2018).*

International Search Report and Written Opinion received for PCT Patent Application No. PCT/EP2019/068993, mailed on Aug. 12, 2019, 10 pages.

Manthiram et al., "Rechargeable Lithium-Sulphur Batteries", Chem. Rev., 2014, vol. 114, pp. 11751-11787.

Wei et al., "A Stable Room-temperature Sodium-sulfur Battery", Nature Communications 7, Article No. 117222, Jun. 9, 2016, [doi 10.1038/ncomms11722], 10 pages.

Patel et al., "Li-S Battery Analyzed by UV/Vis in Operando Mode", ChemSusChem, vol. 6, Issue No. 7, Jul. 2013, pp. 1177-1181.

International Search Report and Written Opinion received for PCT Patent Application No. PCT/EP2018/069903, mailed on Sep. 11, 2018, 09 pages.

Thompson et al., "Stabilization of lithium metal anodes using silane-based coatings", Electrochemistry Communications, vol. 13, Issue 12, Dec. 2011, pp. 1369-1372.

Liu et al., "The Effect of Dichlorodimethylsilane on the Properties of Li—S Cell", Guangzhou Chemical Industry, vol. 42, No. 6, Mar. 2014, 3 Pages. (English Abstract only).

Office Action Received for Japanese Application No. 2021-501283, Mailed on Sep. 1, 2023, 11 Pages(6 Pages of English Translation and 5 Pages of Official Copy).

Office Action Received for Indian Application No. 202047007240, Mailed on Mar. 10, 2022, 6 Pages(6 Pages of Official Copy).

Office Action Received for Taiwan Application No. 107125317, Mailed on Nov. 15, 2021, 11 Pages(8 Pages of English Translation and 3 Pages of Official Copy).

Office Action Received for Chinese Application No. 202080009800. 3, Mailed on Oct. 9, 2022, 22 Pages(12 Pages of English Translation and 10 Pages of Official Copy).

King et al., Communication-organic Silane Coupling Agent Si-69: a New Organosulfur Cathode Material for 3 Rechargeable Lithium Batteries, Journal of Electrochemical Society, vol. 165, Issue No. 16, Dec. 7, 2018, pp. A3782-A3784, XP055562467.

Karger et al., "Performance Improvement of Magnesium Sulfur Batteries With Modified Non-Nucleophilic Electrolytes" Advanced Energy Materials, 2015, 9 Pages.

* cited by examiner

PROCESS FOR PREPARING SULFUR CONTAINING ORGANOSILANE POLYMERS

CROSS REFERENCE TO RELATED APPLICATIONS

This is a National stage application of International application No. PCT/EP2019/068993, filed 15 Jul. 2019, which claims priority of European application No. 18184353.3, filed 19 Jul. 2018, which is incorporated herein by reference in its entirety.

FIELD

The present disclosure relates to a process for preparing sulfur containing organosilane polymers, new sulfur containing organosilane polymers, use of said sulfur containing organosilane polymers in a sulfur cement pre-composition and in a surface modification agent and in an electric energy storage device, and compositions and devices comprising the same.

BACKGROUND

Various electric energy storage devices such as lithium-sulfur and sodium-sulfur batteries are known in the art. A recent article by A. Manthiram et al. ("*Rechargeable Lithium-Sulfur batteries*", Chem. Rev. 2014, 114, pages 11751-11787) explains the principles of Li—S batteries, as well as the historical development and technical challenges. Important technical challenges of current Li—S batteries are inter alia: the formation of unwanted, long polysulfides that are soluble in common liquid electrolytes (which can cause the loss of sulfur as a cathode material over time and thus decreases the battery capacity and life-time, the so-called 'shuttle effect'); density differences between the reactants, lithium and sulfur, and di-lithiumsulfide (the final reaction product); and poor conductivity of elemental sulfur.

Until recently, sodium-sulfur batteries required elevated temperatures for the operation thereof. Wei et al. (Nature Communications 7, Article number 11722(2016) [doi 10.1038/ncomms11722] have shown that Na—S operation at room temperature is possible. However, this requires a specially prepared sulfur cathode material in which the sulfur is contained in nanoporous material, which is expensive and requires a complicated preparation process to achieve.

In European Patent application No. 17183002.9 an electric energy storage device is described comprising an anode comprising an alkali metal selected from lithium and sodium or a combination thereof; and a cathode comprising a sulfur-containing organosilane compound or a mixture thereof; and an electrolyte placed between the anode and the cathode. According to European Patent application No. 17183002.9 the formation of unwanted, long polysulfides (e.g. containing 4 or more sulfur atoms) in the electrolyte can be reduced or even avoided because the sulfur-containing organosilane compounds used in said device or battery, can react with lithium or sodium from the anode without creating long polysulphides. Furthermore, the silane functionality is believed to allow chemical bonding directly to the metal of the current collector of the cathode or conductivity improvers (if any) or indirectly by formation of an oligomerized network, which may allow flexibility that can mitigate the volume changes when reaction takes place between the sulfur contained in the sulfur-containing organosilane compounds and lithium or sodium.

However, the commercial availability of sulfur-containing organosilane compounds useful for the above described electric energy storage devices is limited, and, as a consequence, there is a need for more organosilane compounds, especially for branched compounds which confer desired properties specifically useful in battery systems.

Therefore, the present disclosure relates to a process to prepare sulfur-containing organosilane compounds and further the present disclosure relates to certain new sulfur-containing organosilane compounds.

In U.S. Pat. No. 4,384,132 a process is described for the preparation of bis(silylethyl)oligosulphides containing more than 6 and up to 8 sulphur atoms, by reacting a vinyl silane of the formula $(CH_2=CH)_m-SiR_n^1R_{4-(m+n)}$ in which R represents chlorine, bromine, iodine, $C_1$-$C_3$-alkoxy, 2-methoxyethoxy, 2-ethoxyethoxy or hydroxy, $R^1$ represents $C_1$-$C_3$-alkyl, phenyl or $C_5$-$C_7$-cycloalkyl, n is 0, 1 or 2, m is 1 or 2 and m+n is 1, 2 or 3, with sulfur, as well as with hydrogen sulfide, in molar ratios of vinyl silane to sulfur of from 1:2.5 to 1:10 and vinyl silane to hydrogen sulfide of from 1:0 to 1:5 at temperatures between about 100° C. and 200° C. under pressure of from 1 to 25 bars (total pressure at the reaction temperature) and in the presence of hydroquinone, in a given case followed by hydrolysis or partial hydrolysis of the reaction products. The bis-(silylethyl)-oligosulfides formed by said reaction are used as reinforcing additives (adhesive agents) in crosslinkable rubber mixtures containing silicate fillers and, in a given case, carbon black as well as, in a given case, sulfur and other customary constituents.

The process of U.S. Pat. No. 4,384,132, however, does not provide the presently desired branched sulfur-containing organosilane compounds. Therefore, there is a need for another process for producing those branched compounds.

SUMMARY

Accordingly, the present disclosure relates to a process comprising reacting sulfur with a vinylsilane in a solvent and in the presence of a catalytic amount of an accelerator at an elevated temperature of at least 40° C. to provide sulfur-containing branched organosilane polymers. The term polymers herein also comprises oligomers.

Further, the present disclosure relates to sulfur-containing branched organosilane polymers comprising consecutive units of the general formula (II)

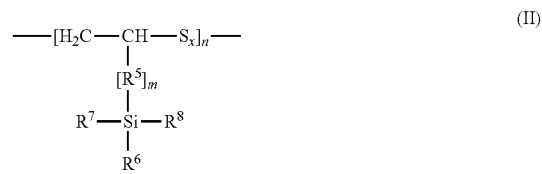

wherein
n is an integer from 3 to 50;
$R^5$ is independently selected from alkylene and arylene; m is an integer independently selected from 0 to 20; x is an integer independently selected from 2 to 8; and
wherein $R^6$, $R^7$ and $R^8$ are independently selected from $C_{1-12}$ alkoxy, $C_{1-12}$ acyloxy, aryloxy, $C_{1-12}$ alkyl, vinyl, aryl, each of which may optionally be substituted, hydroxyl and halogen groups, and each of $R^6$, $R^7$ and $R^8$ may independently be another unit of formula (II).

In addition, the present disclosure relates to the use of said sulfur-containing branched organosilane polymer(s) for several purposes, in particular in a cathode of an electric energy storage device, in a sulfur cement pre-composition or in a surface modification agent for minerals and silica particles.

Further, the disclosure relates to an electric energy storage device, in particular a battery, comprising a cathode comprising a sulfur-containing organosilane polymer as disclosed herein, or a mixture of said polymers, or a mixture thereof with other organosilane compounds.

DETAILED DESCRIPTION

Figure 1:
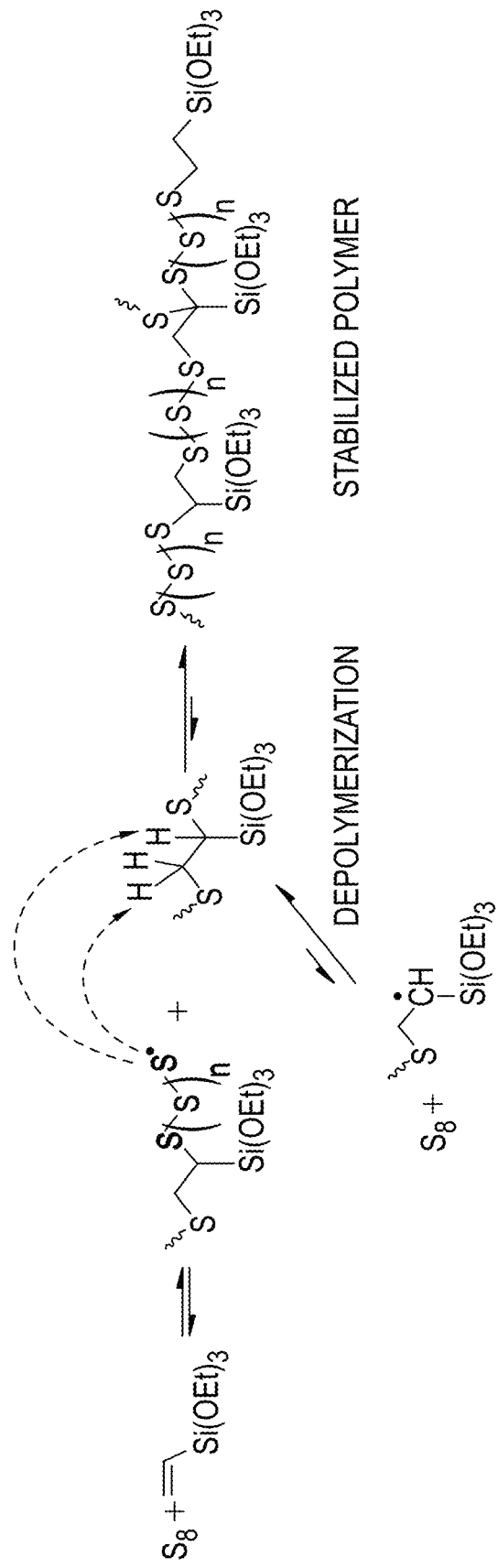
FIG. 1. Gives a proposed mechanism of a reaction according to the present disclosure between vinyltriethoxysilane—as an example—and sulfur.

Without being bound to particular theory, FIG. 1 illustrates a possible reaction mechanism between an exemplary vinylsilane compound and sulfur in solution under conditions as described in the present application. Contrary to the process described in U.S. Pat. No. 4,384,132, the process of the present disclosure provides highly branched polymeric compounds. The compounds of U.S. Pat. No. 4,384,132 are compounds that are used in rubber technology, being dimeric compounds and having the general bis(silylethyl) oligosulfide formula (as confirmed by NMR analysis according to U.S. Pat. No. 4,384,132):

in which R represents substituents including $C_1$-$C_3$-alkoxy and $R^1$ represents substituents such as $C_1$-$C_3$-alkyl; n=0, 1 or 2; m=1 or 2, m+n=1, 2 or 3; and x=2.0 to 8.0.

The molecular weights (Mw in g/mol) of the sulfur-containing branched organosilane polymers obtained by the process of the present disclosure range from 1500 and higher. Preferably, the Mw is from 2000 and higher, preferably up to Mw=5000.

The polydispersity index Mw/Mn (wherein $M_w$ is the mass-average molar mass (or molecular weight) and $M_n$ is the number-average molar mass (or molecular weight) of the presently described polymers of formula II is higher than 2, which indicates that the mass distribution of the polymers is not mono-disperse and hence indicates the presence of molecules of different sizes and weights.

The vinylsilane compound used as reagent in the process according to the present disclosure is preferably selected from compounds having the general molecular formula (I):

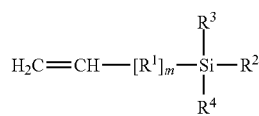

(I)

wherein $R^1$ is independently selected from alkylene (for example methylene, ethylene, propylene, and the like) and arylene (for example phenylene), wherein $[R^1]_m$ is preferably $C_{1-12}$ alkylene, and especially $C_{1-6}$ alkylene; m is an integer independently selected from 0 to 20; and wherein $R^2$, $R^3$ and $R^4$ are independently selected from $C_{1-12}$ alkoxy, $C_{1-12}$ acyloxy, aryloxy (preferably optionally substituted phenoxy), $C_{1-12}$ alkyl, vinyl, aryl (preferably optionally substituted phenyl), each of which may optionally be substituted, hydroxyl and halogen (selected from Cl, Br, F) groups.

Preferred vinylsilane compounds of formula (I) are those in which $R^2$, $R^3$ and $R^4$ are independently selected from $C_{1-12}$ alkoxy (preferably $C_{1-6}$ alkoxy, and especially ethoxy), vinyl and the hydroxyl group. Further, preferably m is selected from 0 to 10, particularly m is selected from 0 to 5, most preferably m is 0. A highly preferred vinylsilane compound is vinyl triethoxy silane (VTES). Other preferred vinylsilane compounds are trivinylsilanes, such as trivinylmethoxysilane and trivinylethoxysilane.

The ratio of the reactants in the presently claimed process, sulfur and vinyl silane, may be varied over a certain range. The ratio of sulfur to the vinyl silane suitably is in the range 25:1 to 1:1, preferably from 15:1 to 2:1, more preferred from 8:1 to 2:1, and in particular from 3:1 to 2:1. Specifically, the molar ratio of sulfur to the vinyl silane is in the range of 2.6 to 2.2.

Suitably, the concentration of sulfur is from 0.5 to 15 mol·l$^{-1}$. Preferably, the sulfur concentration is from 2 to 8, more preferred from 3 to 7, even more preferred from 4 to 6 mol·l$^{-1}$. In particular, the concentration of sulfur may be from 5.0 to 5.5 mol·l$^{-1}$.

In the process according to the present disclosure a catalytic amount of an accelerator is used. Accelerators as meant herein are known from sulfur vulcanization chemistry. Accelerators break sulfur chains. There are many accelerators available for the vulcanization of rubber. Sulfur as vulcanizing agent has a requirement that the elastomers must contain chemical unsaturation for sulfur cross linking. An accelerator is defined as: a compound added to increase the speed of rubber vulcanization and/or to permit vulcanization to proceed at lower temperature and with greater efficiency. The definition of an accelerator does not include compounds that may be identified as stabilizers, which are compounds that react with free radicals in polymerization reactions, such as hydroquinone and derivatives thereof. Many types of accelerators may be used in the process of the disclosure. Particularly suitable accelerators are selected from the thiuram family, e.g. tetraethylthiuram disulfide (TETD), tetramethylthiuram monosulfide (TMTM), tetramethylthiuram disulfide (TMTD), dipentamethylene thiuram tetrasulfide (DPTT), tetrabenzylthiuram disulfide (TBzTD), and from the class of bis(3-trialkoxysilyl-propyl)polysulphides (BTAPS), e.g. bis(3-triethoxysilyl-propyl)polysulphide (BTEPS). Especially, accelerators are selected from tetraalkylthiuram disulfides, preferably TETD or TMTD, or BTEPS.

The amount of the accelerator used is a catalytic amount, i.e. an amount sufficient to increase the reaction rate. Suitably, the accelerator is present in an amount of between 0.01 and 2 wt %, in particular in 0.5 to 0.9 wt %, preferably 0.6 wt % to 0.8 wt %, wherein the weight percentage relates to the combined weight of sulfur, vinylsilane and accelerator used.

The solvent in the present process preferably is an aromatic solvent. An aromatic solvent is a solvent that contains an aromatic hydrocarbon, suitably being benzene, phenols, toluene, xylene or styrene, or mixtures of aromatic hydrocarbons. A particularly preferred solvent is xylene, in particular p-xylene.

The process of the disclosure is suitably carried out at a pressure of from 1 to 3 bars, but preferably at ambient pressure (1 bar).

The process of the present disclosure is performed at elevated temperature, preferably being 50-140° C., and more preferably from 70-140° C. Above 140° C. undesired longer sulfur chains start to form.

Sulfur-containing branched organosilane polymers obtained by the process of the disclosure are also in the scope of the present disclosure. In the polymeric compounds of formula (II), $R^5$ has the same meaning as $R^1$, whereas the groups $R^6$, $R^7$ and $R^8$ may have the same meaning as $R^2$, $R^3$ and $R^4$ in the starting vinylsilane compound of formula (I), respectively, but also may be selected from another unit of formula (II). Preferred polymers of formula (II) are those in which $R^6$, $R^7$ and $R^8$ are independently selected from $C_{1-12}$ alkoxy (preferably $C_{1-6}$ alkoxy, and especially ethoxy), vinyl and the hydroxyl group. It is noted here that in case the vinylsilane compound of formula (I) has two or more unsubstituted vinyl substituents, each of those vinyl groups may react with sulfur and polymerize per se. In those cases, for each of the substituents $R^2$, $R^3$ and $R^4$ of structure (I) being vinyl, the corresponding substituents $R^6$, $R^7$ and $R^8$ of the polymers of formula (II) may itself be another polymer of formula (II). Polymers comprising such (repetitive) branching are particularly preferred.

Further, in the polymers of formula (II) preferably m is selected from 0 to 10, particularly m is selected from 0 to 5, most preferably m is 0.

In particular preferred is the sulfur-containing branched organosilane oligomer S-VTES prepared according to the above described process, wherein the solvent is p-xylene, the groups $R^2$, $R^3$ and $R^4$ are each ethoxy and m is 0, the accelerator is tetraethylthiuram disulfide, and the accelerator is present in 0.5 to 0.9 wt %, the molar ratio of sulfur to the vinyl silane is in the range of 2.6 to 2.2 and the concentration of sulfur is from 5.0 to 5.5 mol·l$^{-1}$. This compound is very suitable for application in battery systems.

In a preferred embodiment, polymeric compounds obtained by the presently claimed process comprise consecutive units of the formula (II) wherein n is an integer from 3 to 30, and even more preferably n is 3 to 20, and particularly 3 to 10.

The terminal groups that may be present in the presently disclosed polymers are selected from H and —S—CH$_2$—CH$_2$— $(R^1)_m$—SiR$^2$R$^3$R$^4$, wherein m, $R^1$, $R^2$, $R^3$ and $R^4$ have the meaning as previously defined, and —S—CH$_2$—CH$_2$— $(R^5)_m$—SiR$^6$R$^7$R$^8$, and the terminal group may also have the structure (III)

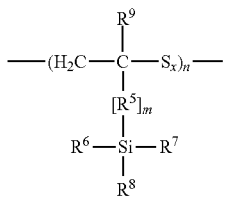

(III)

wherein n, m, x, $R^5$, $R^6$, $R^7$ and $R^8$ have the meaning as previously defined and $R^9$ together with the final $S_x$ represents a sulfur ring structure comprising 2 to 8 sulfur atoms.

The branched structure of the sulfur-containing organosilane polymers of the present disclosure was confirmed by a combination of analytical techniques, such as NMR spectroscopy, SEC, TGA and Maldi-ToF-MS analysis.

The sulfur-containing branched organosilane polymer according to the disclosure can be used for several purposes: the silane functionality can be used for grafting on suitable mineral surfaces, e.g. but not limited to, the silanol groups at the surface of silica containing compositions or the hydroxyl groups at metals such as aluminium or titanium; while the sulfur groups can react with sulfur binders or hydrocarbons such as rubbers (vulcanisation) and bitumen. The combination allows a chemical bond between minerals and binders to provide durability under water intrusion, e.g. but not limited to, for asphalt compositions, sulfur concrete, and inclusion of silica particles in rubber composition as used in tires. Therefore, the present invention also relates to the use of a sulfur-containing branched organosilane polymer as described above in a sulfur cement pre-composition or in a surface modification agent for minerals and silica particles, or, preferably, in a cathode of an electric energy storage device.

Accordingly, the present disclosure also relates to a sulfur cement pre-composition comprising a sulfur-containing branched organosilane polymer according to the invention. In another embodiment, the disclosure relates to a surface modification agent for minerals and silica particles comprising a sulfur-containing branched organosilane polymer as described herein.

A preferred embodiment of the present invention relates to an electric energy storage device, in particular a battery, at least comprising an anode comprising an alkali metal selected from lithium and sodium or a combination thereof; a cathode comprising a sulfur-containing organosilane polymer according this invention, or a mixture of said polymers, or a mixture thereof with other organosilane compounds; and an electrolyte placed between the anode and the cathode.

The person skilled in the art will readily understand that the type of electric energy storage device can vary broadly and may include batteries and supercapacitors. Preferred storage devices are sulfur batteries with anodes comprising lithium, sodium, magnesium, calcium, zinc, aluminum or mixtures thereof. Preferably, the electric energy storage device is a battery, in particular a lithium-sulfur or a sodium-sulfur battery.

As mentioned above, according to the present invention, the anode comprises an alkali metal selected from lithium and sodium or a combination thereof. The person skilled in the art will readily understand that the anode is not particularly limited, provided it comprises lithium and/or sodium. As the person skilled in the art is familiar with selecting the anode of Li—S and Na—S batteries, this is not further discussed here in detail. Preferably, the anode comprises only lithium or sodium as the alkali metal (hence not a combination of lithium and sodium), preferably only lithium.

The person skilled in the art will readily understand that the cathode is not particularly limited and may be varied broadly. As the person skilled in the art is familiar with selecting the cathode of Li—S and Na—S batteries, this is not further discussed here in full detail. As mentioned above, the cathode comprises a sulfur-containing branched organosilane polymer according to this disclosure or a mixture such polymers, or a mixture thereof with other organosilane compounds, such as those mentioned in European Patent application No. 17183002.9.

Preferably, the cathode comprises a current collector surface that has been at least partly, preferably wholly, modified by grafting a sulfur-containing branched organosilane polymer of formula (II) thereon.

The advantage of chemically grafting of a sulfur-containing branched organosilane polymer of formula (II) onto the current collector is that it allows for a ready contact of the contained sulfur with the current collector of the cathode (or the conductivity improver discussed below). The grafted organosilane polymer forms a thin layer (or flexible polymeric network) on the surface of the current collector (or the conductivity improver discussed below) which is not as brittle as elemental sulfur. As a consequence, the crack-induced material degradation and related loss of electrical conductance are reduced upon reacting lithium or sodium with the sulfur contained in the sulfur-containing organosilane polymer.

As the person skilled in the art is familiar with selecting the current collector, this is not further discussed here in detail. Typically, the current collector has a resistivity ($\rho$) of at most 10 $\Omega \cdot m$, preferably at most 1 $\Omega \cdot m$. Usually, the current collector comprises metal, functionalized carbon, etc. According to the present invention it is particularly preferred that the current collector is comprised of a material that allows for grafting of sulfur-containing branched organosilane polymers (preferably via hydroxyl or alkoxy groups of the sulfur-containing organosilane compounds, if any). Preferably, the current collector comprises aluminium. Even more preferably, at least 80 wt. % of the current collector is comprised of aluminium.

Furthermore, it is preferred that the cathode comprises one or more conductivity improvers, preferably selected from the group consisting of metal particles, carbon particles or a combination thereof. Suitable examples of metal particles are aluminium, copper, silver and titanium particles, preferably aluminium particles. Suitable examples of carbon particles are graphite, soot, carbon black, carbon fibers, carbon nanotubes, graphene.

The person skilled in the art will readily understand that the grafting of a sulfur-containing branched organosilane polymer of formula (II) on the current collector surface of the cathode can be achieved in various ways. As the person skilled in the art is familiar with grafting, this is not described here in much detail. Typically, the grafting according to the present disclosure results in the attachment of a sulfur-containing branched organosilane polymer of formula (II) to the current collector surface of the cathode by establishing one or more chemical bonds via the silane groups directly onto the current collector surface or onto already attached organosilane. Typically, the grafting according to the present disclosure comprises the steps of cleaning the surface of the current collector of the cathode, applying a sulfur-containing branched organosilane polymer of formula (II) (either pure or via a solvent) onto the current collector surface and allowing a reaction to establish a chemical bonding between the silane polymer and the current collector surface.

As already mentioned above, but emphasized for the sake of clarity, the cathode may comprise one sulfur-containing branched organosilane polymer of formula (II) or a mixture of these polymers or a mixture of sulfur-containing branched organosilane polymers according to the present disclosure and other sulfur-containing organosilane compounds.

As mentioned above, according to the present disclosure, the electric energy storage device comprises an electrolyte between the anode and the cathode. The person skilled in the art will readily understand that the electrolyte can be varied widely and is not particularly limited. Suitable examples of electrolytes are disclosed in the above-mentioned article by Manthiram et al.

In another aspect, the present disclosure provides the cathode as defined in the device according to the present invention.

In an even further aspect, the present disclosure provides a method for preparing a cathode suitable for use in the device according this disclosure, the method at least comprising the steps of:

(a) providing a cathode having a current collector surface;
(b) providing at least a sulfur-containing branched organosilane polymer of formula (II); and
(c) grafting the sulfur-containing branched organosilane polymer on the current collector surface of the cathode thereby obtaining a cathode having an at least partly modified current collector surface.

As mentioned above, as the person skilled in the art is familiar with grafting, this is not described here in further detail. If desired, the at least partly modified current collector surface can be dried at elevated temperatures or by using a vacuum oven to remove or reduce any residual solvent used and/or moisture content. Typical drying temperatures are from 60-100° C. Applied vacuum is typically in the order of $10^{-2}$ mbar.

Hereinafter the invention will be further illustrated by the following non-limiting examples.

EXAMPLES

Example 1

Synthesis of S-VTES: Copolymerization of Elemental Sulfur and Vinyltriethoxysilane (VTES)

Sulfur containing copolymers were prepared via free-radical copolymerization of elemental sulfur with vinyltriethoxysilane.

In a typical experiment, a 250 mL three-neck round bottom flask, equipped with magnetic stirrer and a condenser was charged with 10 g of sulfur, 0.07 g of TETD (tetraethylthiuram disulfide), 2.5 g of VTES and 60 mL of p-xylene. The mass ratio between S and VTES was 4 to 1. The reaction mixture was heated up to 140° C. under Argon atmosphere and a clear solution was obtained. Then it was stirred for 6 h at 140° C. After stirring, the reaction mixture was allowed to cool down to room temperature overnight, during which unreacted sulfur started to precipitate. The reaction mixture was kept still for additional two days to allow sulfur precipitation. The supernatant was separated from unreacted sulfur with a pipette. Finally, the unreacted VTES and p-xylene were removed by rota-evaporation to obtain a viscous dark orange material, further referred to as SVTES 1. The S content of this sample, as measured via elemental analysis, was 25.0 wt %.

Figure 2:
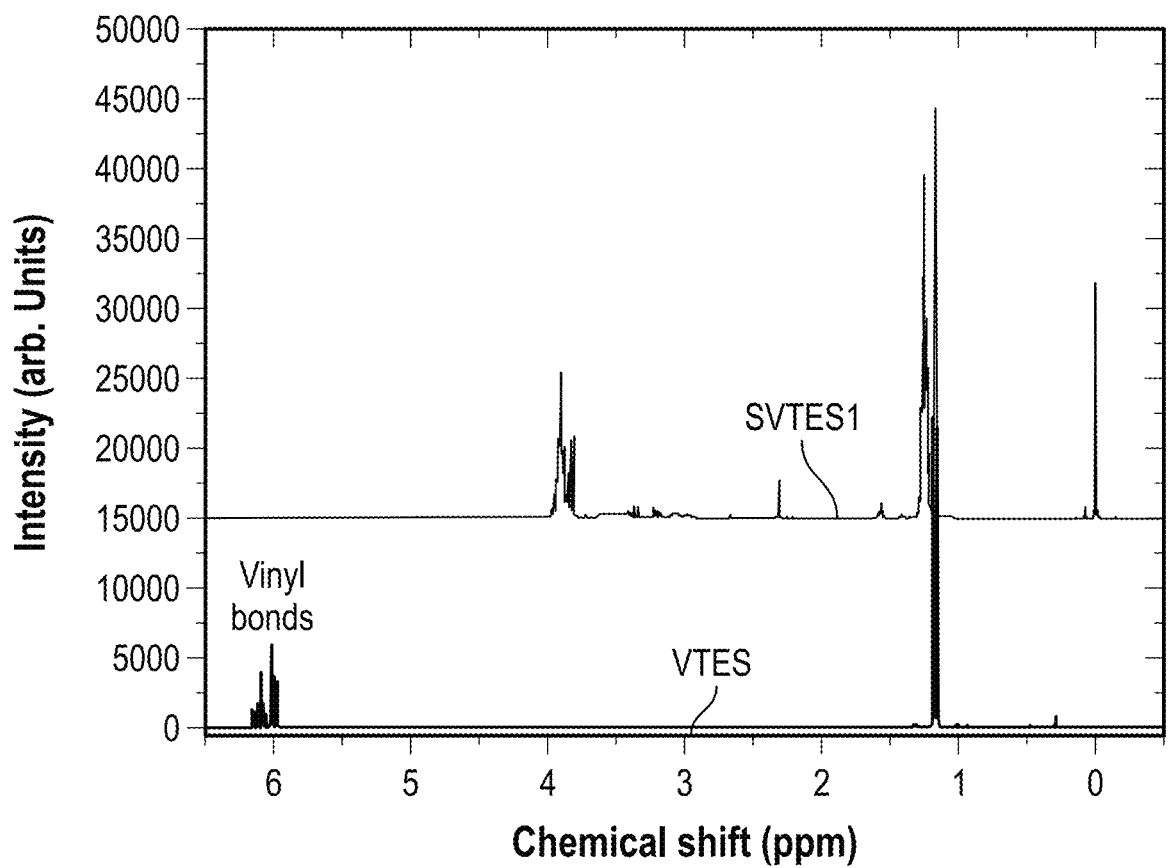
FIG. 2. $^1$H NMR spectrum indicating that the reaction between vinyltriethoxysilane and sulfur has taken place: by disappearance of vinyl double bond signals.

$^1$H NMR spectrum shown in FIG. 2. In the lower part of the spectrum the signals of the starting material VTES are shown and in the upper part the signals of the compound that has formed, S-VTES1. The signals in the NMR spectrum indicate that the reaction has taken place: vinyl bonds clearly disappear, hence the synthesis of SVTES is complete. The person skilled in the art will readily be able to assign the further main peaks in the spectra.

Example 2

In this example the reaction was performed in the same way as Example 1, only the amount of sulfur was 7.5 g and VTES was 5 g, thus having mass ratio S:VTES=1.5:1. The reaction product is referred to as SVTES 2. The S content of this sample was 18.0 wt %.

Example 3

In this example the reaction was performed in the same way as Example 1, only the amount of VTES was 15 g (thus having mass ratio S:VTES=1:1.5), TETD was 0.16 g and the solvent p-xylene was 120 mL. The reaction product is referred to as SVTES 3. The S content of this sample was 21.6 wt %.

Example 4

In this example the reaction was performed in the same way as Example 1, only the amount of sulfur was 7 g and VTES was 15 g, thus having mass ratio S:VTES=1:2.1. Also the reaction mixture was heated to 130° C. and kept like that overnight, followed by 5 h at 150° C. The reaction product is referred to as SVTES 4. The S content of this sample was 16.9 wt %.

Example 5

This example was obtained in a reaction without solvent or accelerator, but in the presence of an inhibitor (hydroquinone). This reaction was a reproduction of a reaction described in U.S. Pat. No. 4,384,132A of Degussa AG. An autoclave, equipped with magnetic stirrer was charged with 3 g of sulfur, 2.6 mL (2.3 g) of VTES and 0.120 g of hydroquinone. The autoclave was closed and then placed in an oil bath which was heated-up to 150° C. The reaction was stirred at 150° C. for 7 h, after which the reactor was cooled down and the pressure released. The product was a dark brown-red low-viscosity liquid, further referred to as SVTES 5.

A summary of some data of the performed reactions is listed in Table 1.

TABLE 1

Summary of performed reactions for synthesis of SVTES copolymers.

| Sample | Mass ratio S:VTES | Molar ratio S:VTES | S concentration (S/solvent, mol/L) | TETD concentration (TETD/S, wt %) | Hydroquinone concentration (hydroquinone/S wt %) |
|---|---|---|---|---|---|
| SVTES 1 | 4:1 | 24:1 | 5.2 | 0.7 | — |
| SVTES 2 | 1.5:1 | 9:1 | 3.9 | 0.9 | — |
| SVTES 3 | 1:1.5 | 4:1 | 2.6 | 1.6 | — |
| SVTES 4 | 1:2.1 | 3:1 | 2.2 | 2.3 | — |
| SVTES 5 | 1.3:1 | 8:1 | — | — | 4.0 |

Characterization of SVTES Copolymers

Size Exclusion Chromatography (SEC) was used to determine both the molecular weight and the molecular weight distribution of the sulfur containing reaction products, with Polyethylene glycol (PEG) as a calibration standard. THF was used as eluent. The injection volume was 50 µL. The eluent flow rate was 1.0 mL/min. Data acquisition and processing was performed using Empower software. Before analysis, each sample was filtered through a 0.2 µm PTFE filter. The obtained molecular weights were calculated with respect to PEG (polyethylene glycol) standards.

Figure 3:
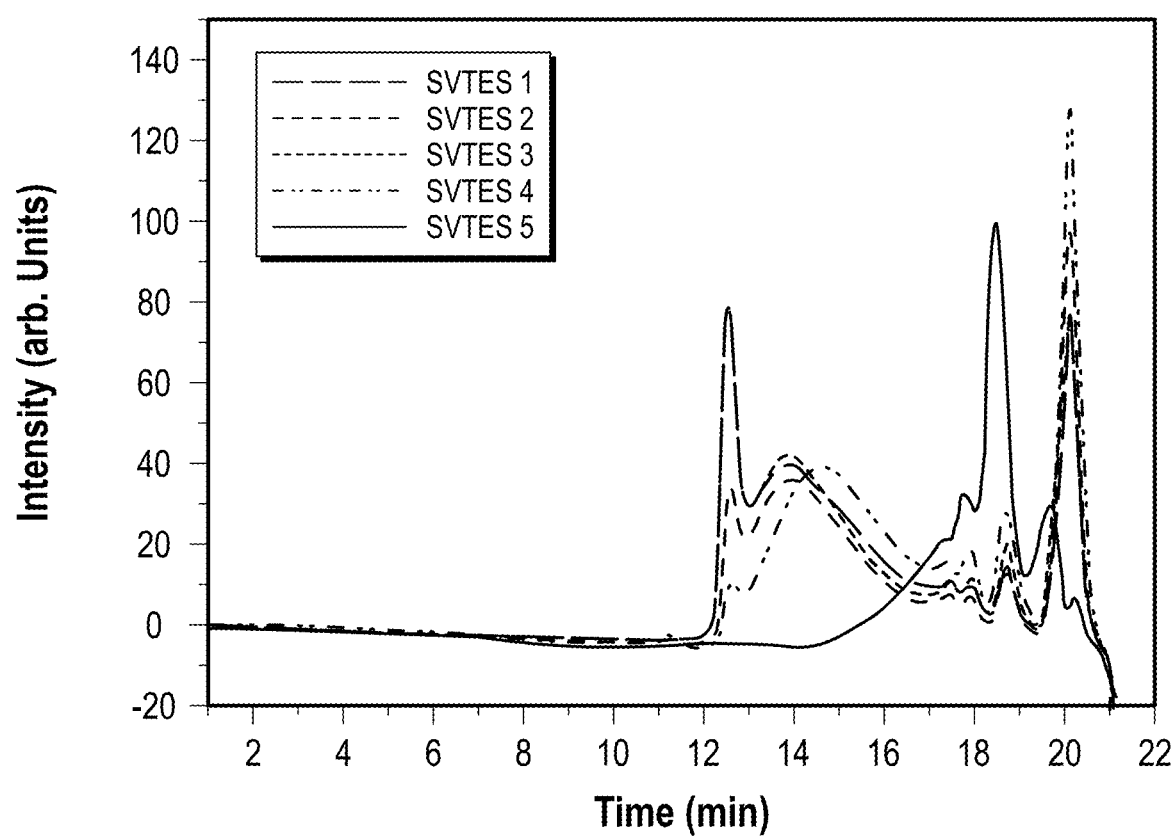
FIG. 3. Size Exclusion Chromatography traces recorded for the SVTES copolymers 1 to 5 in an intensity vs. time plot.

The SEC data obtained for all synthesized samples is plotted in FIG. 3. It clearly demonstrates that the sample synthesized following the Degussa patent (SVTES 5) contains mostly low Mw species, i.e. oligomers (main sharp peak at ~18 min), while the samples synthesized in a solvent using an accelerator (SVTES 1 to 4) are composed predominantly of high Mw species (broad peaks from 12 to 21 min), i.e. polymeric materials. The Mw calculated from these SEC traces are shown in Table 2. The samples obtained via synthesis in solution (SVTES 1 to 4) have molecular weight in the range of 2000-3000 with a large value for the polydispersity index, suggesting that the materials are polymeric and branched. Sample SVTES 5, prepared according to Degussa patent has a very low Mw, around 600, which corresponds to molecules with only a few VTES units (dimers, trimmers). The polydispersity index for this sample was also very low, indicating no or very low branching of the species.

TABLE 2

Molecular weight data for the synthesized SVTES copolymers.

| Sample | $M_w$ (g/mol) | Polydispersity index ($M_w/M_n$) |
|---|---|---|
| SVTES 1 | 3364 | 5.2 |
| SVTES 2 | 3098 | 5.3 |
| SVTES 3 | 3037 | 5.4 |
| SVTES 4 | 2314 | 4.4 |
| SVTES 5 | 664 | 1.4 |

Conclusion

Both the average molecular weight Mw and the polydispersity index Mw/Mn indicate that in the SVTES 1-4 syntheses large molecular structures were obtained (higher Mw) with different sizes (higher polydispersity index), whereas the SVTES 5 synthesis led to smaller molecules, with an almost monodisperse distribution.

Example 6

Copolymerization of Elemental Sulfur and Trivinyl-Methoxysilane (SHLB-001)

A 100 mL Schlenk equipped with a magnetic bar was charged under argon with 3.45 g of sulfur, 0.08 g of tetramethyl-thiuram disulfide, 1.00 g of trivinylmethoxysilane and 25 mL of p-xylene. The mixture was heated to 140° C. and a clear yellow solution was formed within few minutes. The mixture was stirred at this temperature for 18 h. The dark precipitate appearing during the reaction was then separated from the solution by filtration at 140° C. using a filtering cannula, washed three times with 10 mL of p-xylene at 140° C.) and one time with 10 mL of petroleum ether 40-60 (20° C.). The dark insoluble solid material was further dried in vacuo (1.07 g).

Copolymerization of elemental sulfur and of trivinyl-ethoxysilane proceeds under the same conditions as described above for trivinylmethoxysilane.

Example 7. Electrochemical (EC) Measurements

The SVTES 3 copolymer was tested as cathode material for Lithium Sulfur (LiS) batteries.

0.1 g of SVTES 3 was pre-hydrolyzed in a mixture of 0.2 g THF and 0.1 g isopropyl alcohol at 70° C. and stirring for 1 hour. Then 0.01 g of carbon black (CB) was added to the SVTES 3 solution and ultra-sonicated for 1 hour. The resulting black slurry was coated onto an Al foil (15 µm thick) and dried under vacuum at 110° C. for 3 days. From the obtained film, 15 mm diameter disk was cut and used as cathode. Thus, SVTES-3 90 CB10 stands for a film made of 90 wt. % SVTES 3 and 10 wt. % CB.

The electrolyte used for the Li battery was prepared in an Argon filled glovebox and consisted of 1M solution of LiTFSI salt in a mixture (1 to 1 by volume) of DOL and DME solvents and 1 wt. % of LiNO3.

Coin cell 2032 battery was assembled in Argon filled glovebox. As anode was used a Li metal disk (15.6 mm diameter) and as a separator was used Celgard 2400 membrane cut to a disk with a diameter 20 mm. The cathode, anode and separator were pre-soaked in the electrolyte for 10 min before assembling the battery. The battery was crimped using an electric crimping machine (MSK-E110 from MTI Corp.).

Cyclic Voltammetry (CV) curves were recorded using an Autolab potentiostat from Metrohm Autolab B.V. (Utrecht, Netherlands). The CV curves were obtained with the following settings: rate 0.05 mV s−1, step 0.00244 V, lower potential 1.7 V, upper potential 2.9 V.

Figure 4:
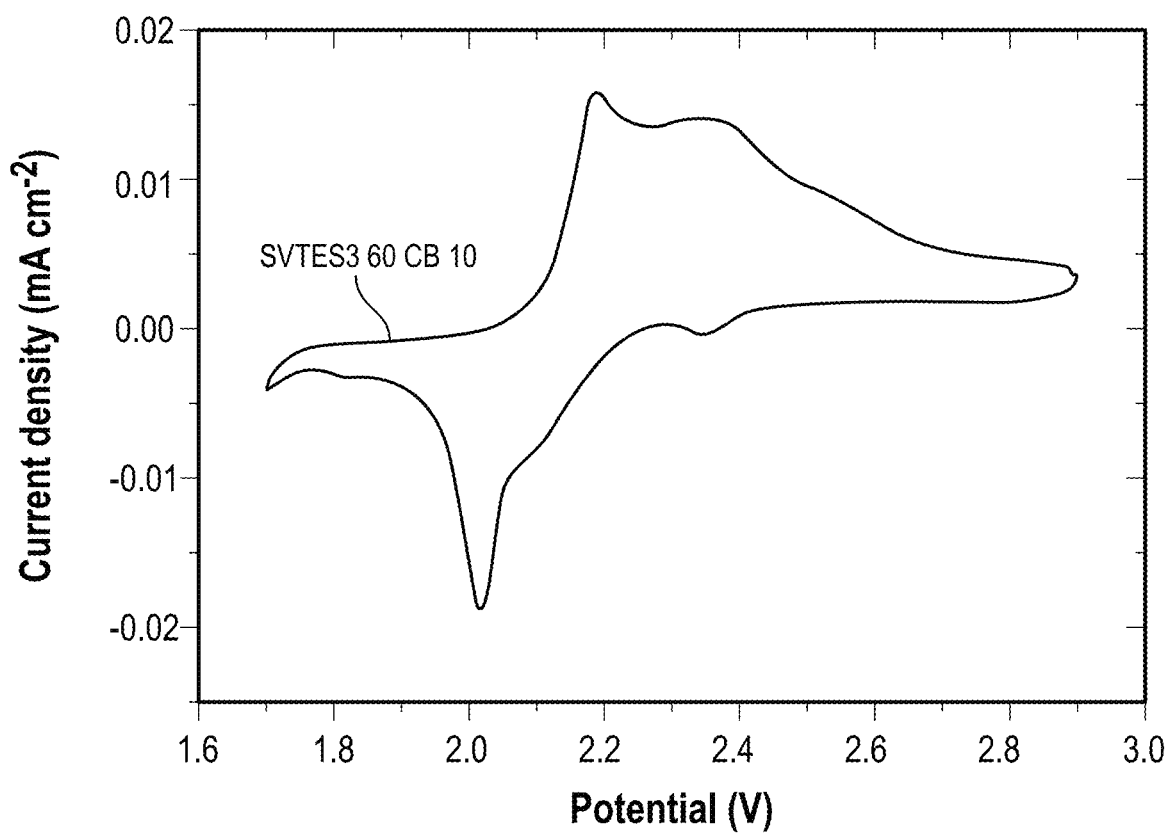
FIG. 4. Cyclic Voltammetry curve recorded with SVTES 3 copolymer, used as a cathode material for a Lithium Sulfur battery.

FIG. 4 shows the CV curve recorded for a Li battery based on SVTES 3 copolymer as cathode material. On the reduction cycle (negative currents) the battery has a main peak at ~2.0 V and with respect to the oxidation cycle (positive currents) the battery has a broad double peak from approximately 2.1 to 2.7 V. These clear peaks on reduction and oxidation scans confirm the electrochemical activity of SVTES3 compound in Li battery.

Conclusion

The EC measurements show that the polymers of the present disclosure (as exemplified by the SVTES 3 copolymers) can be used as a cathode material in a LiS type battery.

Example 8: Cathode Preparation by Grafting

Cathodes can for example be prepared by grafting a sulfur-containing organosilane compound of formula (II) on aluminium foil and aluminium substrate can be provided as follows.

The aluminium foils and substrate are exemplary for materials that can be used as a current collector of a cathode in a battery; the person skilled in the art would readily understand how to produce a battery whilst using the grafted current collector as prepared in these examples in a cathode. The aluminium foils and substrates are first cleaned with heptane and ethanol in order to remove any surface contamination.

A few drops of a solution of sulfur-containing organosilane compound in ethanol are placed an Al foil and then spread over the surface to form thin film. Then the foils are placed for 48 hours in an oven at 90° C. to graft the sulfur-containing organosilane compound on the Al foils. Finally, the Al foils grafted with sulfur-containing organosilane compound are rinsed with ethanol to remove non-reacted sulfur-containing organosilane molecules and dried in a desiccator for 48 hours. The film thickness of the grafted organosilane compound on the substrate can for example be determined using an optical interferometer (Zoomsurf 3D, Fogale Nanotech (Nimes, France)) using white light and magnification of 20, or using a contact profilometer (model Dektak XT obtained from Bruker (Leiderdorp, the Netherlands).

We claim:

1. A process for preparing sulfur-containing branched organosilane polymers comprises:
reacting sulfur with a vinyl silane compound in a solvent and in the presence of a catalytic amount of an accelerator at an elevated temperature of at least 40° C., wherein the concentration of sulfur is from 0.5 to 15 mol·l$^{-1}$.

2. The process according to claim 1, wherein the vinyl silane compound has the general formula (I):

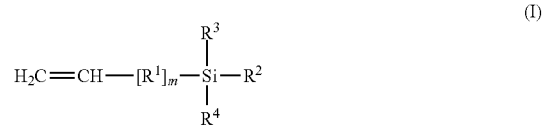

wherein R$^1$ is independently selected from alkylene and arylene;
m is an integer independently selected from 0 to 20;
and wherein R$^2$, R$^3$ and R$^4$ are independently selected from C$_{1-12}$ alkoxy, C$_{1-12}$ acyloxy, aryloxy, C$_{1-12}$ alkyl, vinyl, aryl, each of which may optionally be substituted, hydroxyl and halogen groups.

3. The process according to claim 2, where R$^2$, R$^3$ and R$^4$ are independently selected from C$_{1-12}$ alkoxy, vinyl and hydroxyl group, and m is selected from 0 to 10.

4. The process according to claim 1, wherein the accelerator is selected from the thiuram family.

5. The process according to claim 4, wherein the accelerator is a bis(3-trialkoxysilylpropyl)-polysulphide.

6. The process according to claim 4, wherein the accelerator is a tetra-alkylthiuram disulfide.

7. The process according to claim 1, wherein the solvent is an aromatic solvent.

8. The process according to claim 1, wherein the molar ratio of sulfur to the vinyl silane is in the range 25:1 to 1:1.

* * * * *